Patented July 26, 1932

1,868,596

UNITED STATES PATENT OFFICE

EGON EICHWALD, OF AMSTERDAM, NETHERLANDS, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS OF RECOVERING SULPHONIC ACIDS OR THEIR SALTS IN A PURIFIED CONDITION FROM IMPURE SULPHONATION PRODUCTS

No Drawing. Application filed March 13, 1931, Serial No. 522,508, and in Germany March 10, 1930.

The invention relates to a process for recovering sulphonic acids and their salts in a technically pure condition from impure products containing these sulphonic acids together with electrolytes, such as sulphuric acid, or other impurities.

When causing sulphuric acid or fuming sulphuric acid, sulphuric anhydride or the like to act upon organic substances, sulphonated products are obtained, which are more or less soiled with sulphuric and sulphurous acids. Also the so-called lignine-sulphonic acids from residual sulphite lye are soiled with electrolytes.

With a view to various applications, the presence of inorganic acids or salts in sulphonic acids is objectionable.

For instance, when using sulphonic acids as emulsifier for so-called soluble oil, the inorganic salts, such as sodium sulphate, often appear to crystallize out after some length of time, thus causing obstructions in the pump lines and other connections. Further it appears that when sulphonic acids are used as emulsifier for asphalt and the like substances, the salts contained in the acids have a flocculating action on the emulsion and consequently render the emulsifier unsuitable.

Now according to the present invention sulphonic acids or their salts are obtained in a sufficiently pure condition for technical purposes by treating the impure products with alcohols which are insoluble or practically insoluble in water, such as amyl alcohol, butyl alcohol, cyclohexanol and the like, and thereupon treating the alcoholic solution of sulphonic acids thus obtained once or several times with water, in order to remove the impurities as completely as possible from the alcoholic solution.

In this way after separation of the water an alcoholic solution of sulphonic acids is obtained, from which the sulphonic acids are recovered by distilling off the alcohol and may thereupon be converted into the corresponding salts, if desired. In order to enable the distillation of the alcohol to be carried out without decomposition of the sulphonic acids, preference will be given to alcohols of a relatively low boiling point, for instance alcohols with 4 to 7 carbon atoms.

The process according to the invention is particularly advantageous for the purification of water-soluble sulphonic acids, such as are contained in acid sludges, which may be treated according to the invention either directly or after a preliminary washing with water. In the case of such water-soluble sulphonic acids, it is preferable to wash their alcoholic solution with water only once, because when washing with water several times emulsions may be formed which only separate with difficulty. Frequent washings are, moreover, unnecessary, seeing that after a single washing, sulphonic acids can be obtained which are sufficiently free from sulphuric acid. Thus, by washing once the sulphuric acid content can be reduced say from 20 to 4%.

*Examples*

(1) 100 parts by weight of acid sludge, obtained by treating an edeleanu-(sulphur dioxide-) raffinate of spindle oil with 10% of fuming sulphuric acid, are mixed with 200 parts by weight of water, after which the mixture is allowed to cool. The sulphonic acids are insoluble in dilute sulphuric acid and separate as a tough mass, which is contaminated with a large qquantity of sulphuric acid. In order to free the separated sulphonic acids from the major part of the sulphuric acid, they are treated at a temperature of about 70° C. with the double volume of amyl alcohol (or another suitable water-insoluble alcohol), after which an equal volume of water is added to the alcoholic solution obtained. The whole is thoroughly stirred. The mass is then allowed to settle and two separate layers are formed. The amyl alcoholic top layer is removed from the aqueous bottom layer and subjected to a steam or vacuum distillation at about 100° C. In this way the sulphonic acids are retained in a sufficiently pure state for technical use. The amyl alcohol distilled off may be re-used and also the amyl alcohol which remained in the aqueous layer may be recuperated.

(2) The so-called "hard" sulphonic acids separated from the acid sludge obtained by continued sulphonation of edeleanised spindle oil after this has already been treated with 30% of fuming sulphuric acid, are purified in exactly the same manner as described in Example 1.

I can also start direct from acid sludge, such as derived from the sulphuric acid treatment of the sulphur dioxide-extract or the sulphur dioxide-raffinate of mineral oils, especially spindle oil, treating said acid sludge with amyl alcohol without the above-described preliminary washing by dilution of the acid sludge with water.

The process according to the invention may be applied to any sulphonic acids produced from mineral oils, as also to other sulphonic acids, such as those produced from residual sulphite lye. In the latter case the sulphite lye may be first treated with an acid e. g. hydrochloric acid, in order to set free the sulphonic acids from their compounds, whereupon I may proceed further as described above.

The products obtained according to the invention are eminently suitable, according to their nature, as emulsifiers or stabilizers in the manufacture of dispersions. They particularly lend themselves to the manufacture or stabilization of asphalt dispersions and to the stabilization of natural dispersions, such as rubber latex, whilst some of them can advantageously be used in the manufacture of so-called soluble oil.

Further the purified products are highly suitable for the breaking or de-emulsifying of emulsions of an aqueous phase in a non-aqueous phase, such as petroleum emulsions and the like.

What I claim is:

1. A process for the recovery of sulphonic acids in a purified condition from impure sulphonation products containing inorganic compounds which comprises extracting the sulphonic acids from the inorganic compounds by treating the impure sulphonation products with an alcohol substantially insoluble in water so as to dissolve the sulphonic acids contained therein, washing the alcoholic solution of sulphonic acids thus obtained with water, allowing the mass to stratify and the aqueous layer to separate from the alcoholic layer, and distilling the alcohol from the separated alcoholic solution of the purified sulphonic acids.

2. A process according to claim 1, in which amyl alcohol is used as the alcohol substantially insoluble in water.

3. A process according to claim 1, in which an alcohol containing from 4 to 7 carbon atoms is used as the alcohol substantially insoluble in water.

4. A process according to claim 1, in which the impure sulphonation product treated is an acid sludge derived from the sulphuric acid purification of mineral oil.

5. A process according to claim 1, in which the impure sulphonation product treated is an acid sludge, from which a substantial part of the free sulphuric acid has been removed by a preliminary washing with water.

6. A process according to claim 1, in which the impure sulphonation product treated is a residual sulphite lye.

7. A process according to claim 1, in which the purified sulphonic acids obtained are converted into their salts.

8. In the recovery of purified sulphonation products, the step which comprises a mixture thereof with inorganic compounds extracting the sulphonation products from the inorganic compounds by treating said mixture with a substantially water insoluble alcohol in which said sulphonation products are soluble.

In testimony whereof I affix my signature.

EGON EICHWALD.

CERTIFICATE OF CORRECTION.

Patent No. 1,868,596.　　　　　　　　　　　　　　　　　　　　　July 26, 1932.

EGON EICHWALD.

It is hereby certified that error appears in the printed specification of the above numbered patent requiring correction as follows: Page 2, lines 89 and 90, claim 8, strike out the comma and words ", the step which comprises a mixture thereof with inorganic compounds" and insert instead from a mixture thereof with inorganic compounds, the step which comprises; and that the said Letters Patent should be read with this correction therein that the same may conform to the record of the case in the Patent Office.

Signed and sealed this 26th day of December, A. D. 1933.

Richard Spencer (Seal)　　　　　　　　　　　　　　　　　　　　Acting Commissioner of Patents.

DISCLAIMER 1,868,596.—*Egon Eichwald*, Amsterdam, Netherlands. PROCESS OF RECOVERING SULPHONIC ACIDS OR THEIR SALTS IN A PURIFIED CONDITION FROM IMPURE SULPHONATION PRODUCTS. Patent dated July 26, 1932. Disclaimer filed July 23, 1935, by the assignee, *Shell Development Company*.

Hereby enters this disclaimer to claim 8 in said specification which is in the following words:

"8. In the recovery of purified sulphonation products from a mixture thereof with inorganic compounds the step which comprises extracting the sulphonation products from the inorganic compounds by treating said mixture with a substantially water insoluble alcohol in which said sulphonation products are soluble."

[*Official Gazette August 20, 1935.*]